(12) United States Patent
Shimanuki et al.

(10) Patent No.: US 10,840,551 B2
(45) Date of Patent: Nov. 17, 2020

(54) LITHIUM SECONDARY BATTERY AND MANUFACTURING METHOD THEREFOR

(71) Applicant: NEC Corporation, Tokyo (JP)

(72) Inventors: Ikiko Shimanuki, Tokyo (JP); Hitoshi Ishikawa, Tokyo (JP); Noboru Yoshida, Tokyo (JP); Daisuke Kawasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 547 days.

(21) Appl. No.: 15/502,027

(22) PCT Filed: Aug. 4, 2015

(86) PCT No.: PCT/JP2015/072087
§ 371 (c)(1),
(2) Date: Feb. 6, 2017

(87) PCT Pub. No.: WO2016/021596
PCT Pub. Date: Feb. 11, 2016

(65) Prior Publication Data
US 2017/0229736 A1    Aug. 10, 2017

(30) Foreign Application Priority Data
Aug. 7, 2014   (JP) ................................ 2014-161081

(51) Int. Cl.
*H01M 10/0567* (2010.01)
*H01M 4/525* (2010.01)
(Continued)

(52) U.S. Cl.
CPC ....... *H01M 10/0567* (2013.01); *H01M 4/366* (2013.01); *H01M 4/505* (2013.01);
(Continued)

(58) Field of Classification Search
CPC ......... H01M 10/0525; H01M 10/0567; H01M 10/0569; H01M 10/058; H01M 10/0585;
(Continued)

(56) References Cited

U.S. PATENT DOCUMENTS

2004/0043300 A1*   3/2004   Utsugi .............. H01M 10/0567
                                                          429/329
2007/0212613 A1    9/2007   Ishida et al.
(Continued)

FOREIGN PATENT DOCUMENTS

JP        2007-273445        10/2007
JP        2008-153118         7/2008
(Continued)

OTHER PUBLICATIONS

Machine Translation JP2008153118A (Year: 2008).*
(Continued)

*Primary Examiner* — Victoria H Lynch
(74) *Attorney, Agent, or Firm* — Finnegan, Henderson, Farabow, Garrett & Dunner, L.L.P.

(57) ABSTRACT

The present invention relates to a lithium secondary battery having a positive electrode comprising a positive electrode active material capable of absorbing and releasing lithium ions, a negative electrode comprising a negative electrode active material capable of absorbing and releasing lithium ions, and an electrolyte solution, wherein a positive electrode surface detection component comprises at least one negative secondary ion peak selected from $CH_3S_2O_6^-$ and $CHS_2O_4^-$, and further comprises a negative secondary ion peak of $SO_3^-$, wherein the positive electrode surface detection component is detected when a primary ion is irradiated on the surface of the positive electrode active material by a Time-of-Flight Secondary Ion Mass Spectrometry (TOF-SIMS) method. According to the present invention, it is (Continued)

possible to provide a lithium secondary battery having excellent cycle characteristics.

6 Claims, 3 Drawing Sheets

(51) Int. Cl.
| | |
|---|---|
| *H01M 10/058* | (2010.01) |
| *H01M 10/44* | (2006.01) |
| *H01M 4/36* | (2006.01) |
| *H01M 4/505* | (2010.01) |
| *H01M 4/587* | (2010.01) |
| *H01M 10/0525* | (2010.01) |
| *H01M 10/0569* | (2010.01) |
| *H01M 10/0585* | (2010.01) |
| *H01M 4/02* | (2006.01) |

(52) U.S. Cl.
CPC ........... *H01M 4/525* (2013.01); *H01M 4/587* (2013.01); *H01M 10/058* (2013.01); *H01M 10/0525* (2013.01); *H01M 10/0569* (2013.01); *H01M 10/0585* (2013.01); *H01M 10/446* (2013.01); *H01M 2004/021* (2013.01); *H01M 2220/20* (2013.01); *H01M 2300/0037* (2013.01); *Y02E 60/122* (2013.01); *Y02P 70/54* (2015.11); *Y02T 10/7011* (2013.01)

(58) Field of Classification Search
CPC ......... H01M 10/446; H01M 2004/021; H01M 2220/20; H01M 2300/0037; H01M 4/366; H01M 4/505; H01M 4/525; H01M 4/587
See application file for complete search history.

(56) References Cited

U.S. PATENT DOCUMENTS

2013/0029218 A1\* 1/2013 Waki ................... H01M 4/587
429/200
2015/0125742 A1   5/2015 Yokotsuji et al.

FOREIGN PATENT DOCUMENTS

| | | |
|---|---|---|
| JP | 2009-187940 | 8/2009 |
| JP | 2012-84420 | 4/2012 |
| JP | 2013-51200 | 3/2013 |
| JP | 2013-235790 | 11/2013 |
| JP | 2014-22294 | 2/2014 |
| JP | 2015-90857 | 5/2015 |
| WO | WO 2011-105126 A1 | 9/2011 |
| WO | WO 2014/133163 A1 | 9/2014 |
| WO | WO 2014/133169 A1 | 9/2014 |
| WO | WO 2015/037323 A1 | 3/2015 |

OTHER PUBLICATIONS

Scientific Technical Information Center (STIC / EIC) search results by J. Wang Jun. 23, 2018 (Year: 2018).\*
Machine Translation JP2013-51200 (Year: 2013).\*
International Search Report and Written Opinion dated Nov. 2, 2015, in corresponding PCT International Application.

\* cited by examiner

LITHIUM SECONDARY BATTERY AND MANUFACTURING METHOD THEREFOR

CROSS-REFERENCE TO RELATED PATENT APPLICATIONS

This application is a National Stage Entry of International Application No. PCT/JP2015/072087, filed Aug. 4, 2015, which claims priority from Japanese Patent Application No. 2014-161081, filed Aug. 7, 2014. The entire contents of the above-referenced applications are expressly incorporated herein by reference.

TECHNICAL FIELD

This invention relates to a lithium secondary battery, and more specifically, relates to a lithium secondary battery improved in cycle characteristics, and a method of manufacturing the same.

BACKGROUND ART

With rapid expansion in markets of notebook computer, mobile phone, electric car and the like, secondary batteries having excellent performance have been desired and there are various proposals to improve performance of secondary batteries.

For example, Patent Literature 1 discloses a positive electrode material for a lithium secondary battery, characterized in that the surface of the positive electrode active material is coated with an alkali metal carbonate compound or an alkali metal hydroxide compound, and further, the surface of said compound is coated with a polymer containing a sulfo group, or a sulfo group and a carboxyl group.

Further, Patent Literature 2 discloses a positive electrode active material characterized in that a coating film containing a metal salt, such as lithium sulfopropionate, is formed onto at least one portion of the positive electrode active material, Further, Patent Literature 3 discloses a positive electrode active material, the surface of which is coated with a coating layer consisting of an organic silane compound.

Further, Patent Literature 4 discloses a positive electrode active material which is lithium-manganese composite oxide particles, wherein the surface of the composite oxide particles is coated with a phosphate film and a carbon in this order.

Further, Patent Literature 5 discloses a positive electrode protective agent for a lithium ion secondary battery, containing a copolymer denoted by a specific formula.

CITATION LIST

Patent Literature

Patent Literature 1: Japanese Patent Laid-Open No. 2012-84420
Patent Literature 2: Japanese Patent Laid-Open No. 2009-187940
Patent Literature 3: WO2011/105126
Patent Literature 4: Japanese Patent Laid-Open No. 2014-22294
Patent Literature 5: Japanese Patent Laid-Open No. 2013-235790

SUMMARY OF INVENTION

Technical Problem

Although a technology for coating a surface of a positive electrode has been studied for the purpose of improving performance of a secondary battery as disclosed in Patent Literatures 1 to 5, sufficient battery characteristics have not been obtained yet.

Solution to Problem

An embodiment according to the present invention relates to a lithium secondary battery having a positive electrode comprising a positive electrode active material capable of absorbing and releasing lithium ions, a negative electrode comprising a negative electrode active material capable of absorbing and releasing lithium ions, and an electrolyte solution, wherein a positive electrode surface detection component comprises at least one negative secondary ion peak selected from $CH_3S_2O_6^-$ and $CHS_2O_4^-$, and further comprises a negative secondary ion peak of $SO_3^-$, wherein the positive electrode surface detection component is detected when a primary ion is irradiated on the surface of the positive electrode active material by a Time-of-Flight Secondary Ion Mass Spectrometry (TOF-SIMS) method.

Advantageous Effects of Invention

According to the present invention, it is possible to provide a lithium secondary battery having excellent cycle characteristics.

DESCRIPTION OF EMBODIMENTS

The present inventors have found that a lithium battery having an excellent capacity maintenance rate after charge/discharge cycles can be obtained in cases where the positive electrode surface detection component, detected when a primary ion is irradiated on the surface of the positive electrode active material by a Time-of-Flight Secondary Ion Mass Spectrometry (TOF-SIMS) method, comprises at least one negative secondary ion peak selected from $CH_3S_2O_6^-$ and $CHS_2O_4^-$, and further comprises a negative secondary ion peak of $SO_3^-$.

The reason is not clear why a capacity maintenance rate of the secondary battery where the above specific negative secondary ions are detected by a Time-of-Flight Secondary Ion Mass Spectrometry (TOF-SIMS) method is improved, but it is presumed that the reason is that a SEI coating film capable of suppressing decomposition of electrolytic solution is formed on a surface of the positive electrode.

The peak intensity of the negative secondary ion is not particularly limited, but a peak intensity ratio of the peak intensity of $SO_3^-$ (I1) to the peak intensity of $CH_3S_2O_6^-$ (I2) is preferably in the range of $150 \leq I1/I2 \leq 500$ since it is possible to achieve a more excellent capacity maintenance rate in this case. The peak intensity ratio is more preferably in the range of $200 \leq I1/I2 \leq 500$, and still more preferably in the range of $200 \leq I1/I2 \leq 400$.

The lithium secondary battery according to the present invention can be manufactured, by using, for example, a lithium secondary battery having structure which is specifically described below.

Figure 1:
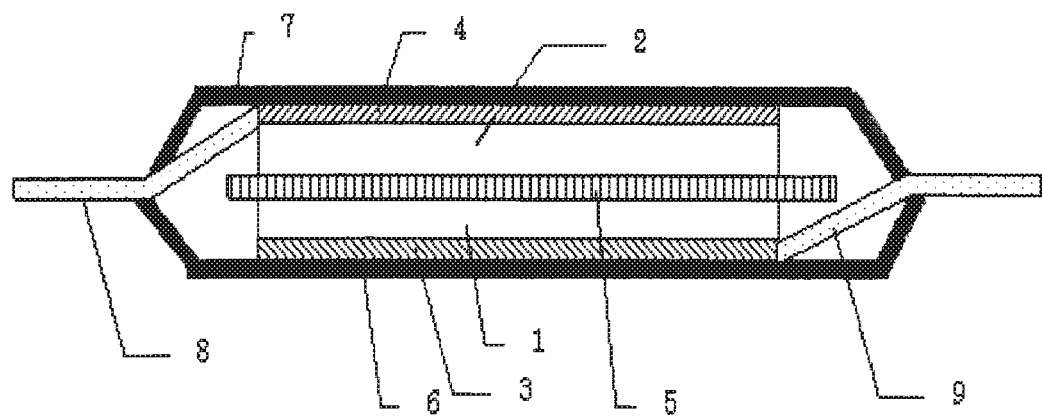
FIG. 1 is a schematic cross-sectional view of a secondary battery according to one embodiment of the present invention.

Structure of the inventive lithium secondary battery will be described in detail with reference to the drawings. FIG. 1 is an example of a schematic drawing of the inventive lithium secondary battery. For example, the battery relating to the present invention has the structure shown in FIG. 1. The positive electrode is constructed by forming a layer 1 containing a positive electrode active material as a film on a positive electrode collector 3. The negative electrode is constructed by forming a layer 2 containing a negative electrode active material as a film on a negative electrode collector 4. These positive electrode and negative electrode are placed via a porous separator 5 so as to face each other. The porous separator 5 is placed in almost parallel with the layer 2 containing a negative electrode active material. In the secondary battery according to the present invention, an electrode element, in which these positive electrode and negative electrode are placed so as to face each other, and an electrolyte solution are enclosed in outer casings 6 and 7. Examples of shape of the non-aqueous secondary battery such as the lithium secondary battery relating to the present embodiment include, but are not particularly limited to, a laminate outer package type, a cylindrical type, a square type, and a coin type.

[1] Electrolyte

In the present embodiment, a liquid electrolyte (an electrolyte solution) is preferably used as an electrolyte.

In the lithium secondary battery of the present embodiment, the electrolyte solution preferably contains a sulfur compound as an additive. Examples of the sulfur compound include cyclic disulfonic acid esters represented by the formula (1) and the like.

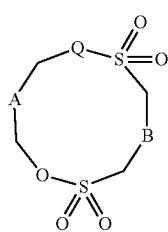

(1)

In the formula (1), Q represents an oxygen atom, a methylene group, or a C—S single bond. A represents a substituted or unsubstituted alkylene group having 1 to 5 carbon atoms; a carbonyl group; a sulfinyl group; a substituted or unsubstituted fluoroalkylene group having 1 to 6 carbon atoms; or a divalent group having 2 to 6 carbon atoms in which a plurality of alkylene units, a plurality of fluoroalkylene units, or an alkylene unit and a fluoroalkylene unit are bonded through an ether bond. B represents a substituted or unsubstituted methylene group, which may be branched; or a substituted or unsubstituted fluoromethylene group, which may be branched.

When Q represents a C—S single bond in the formula (1), the C (carbon atom) for the C—S bond is a part of A described above.

In the formula (1), Q is preferably a methylene group, a C—S single bond, or an oxygen atom (—O—), and more preferably an oxygen atom.

In the formula (1), A represents a substituted or unsubstituted alkylene group having 1 to 5 carbon atoms; a carbonyl group; a sulfinyl group; a substituted or unsubstituted fluoroalkylene group having 1 to 6 carbon atoms; or a divalent group having 2 to 6 carbon atoms in which a plurality of alkylene units, a plurality of fluoroalkylene units, or an alkylene unit and a fluoroalkylene unit are bonded through an ether bond.

In the formula (1), the alkylene group represented by A may be a straight-chain alkylene group represented by —$(CH_2)_n$—, wherein n is an integer of 1-5, and may be a branched alkylene group obtained by replacing at least one of hydrogen atoms of a straight-chain alkylene group represented by —$(CH_2)_n$—, wherein n is an integer of 1-4, with alkyl groups. Examples of the branched alkylene group include —$CH(C_mH_{2m+1})$—, wherein m is an integer of 1-4, —$C(CH_3)_2$—, —$C(CH_3)(C_2H_5)$—, —$C(C_2H_5)_2$—, —$CH_2C(CH_3)_2$—, —$CH_2CH(CH_3)$—, —$CH(CH_3)CH(CH_3)$—, —$CH(CH_3)CH_2CH_2$—, —$CH(CH_3)CH_2CH_2CH_2$— and the like. Examples of the fluoroalkylene group represented by A in the formula (1) include a group obtained by replacing at least one of hydrogen atoms of the above alkylene groups with fluorine atoms. The substitution number and the substitution position of fluorine herein are optional, and all the hydrogen atoms may be replaced with fluorine atoms.

Examples of "the divalent group having 2 to 6 carbon atoms in which a plurality of alkylene units, a plurality of fluoroalkylene units, or an alkylene unit and a fluoroalkylene unit are bonded through an ether bond", represented by A in the formula (1), include —$R^{11}$—O—$R^{12}$—, wherein $R^{11}$ and $R^{12}$ each independently represent an alkylene group or a fluoroalkylene group and the total number of carbon atoms of $R^{11}$ and $R^{12}$ is 2-6, —$R^{13}$—O—$R^{14}$—O—$R^{15}$—, wherein $R^{13}$, $R^{14}$, and $R^{15}$ each independently represent an alkylene group or a fluoroalkylene group and the total number of carbon atoms of $R^{13}$, $R^{14}$ and $R^{15}$ is 3-6, and the like. Both $R^{11}$ and $R^{12}$ may be an alkylene group and also may be a fluoroalkylene group; and one of them may be an alkylene group and the other may be a fluoroalkylene group. $R^{13}$, $R^{14}$ and $R^{15}$ may be each independently an alkylene group or a fluoroalkylene group. For example, —$CH_2$—O—$CH_2$—, —$CH_2$—O—$C_2H_4$—, —$C_2H_4$—O—$C_2H_4$—, —$CH_2$—O—$CH_2$—O—$CH_2$—, —$CH_2$—O—CHF—, —$CH_2$—O—$CF_2$—, —$CF_2$—O—$CF_2$—, —$C_2F_4$—O—$C_2F_4$—, —$CF_2$—O—$CF_2$—O—$CF_2$—, —$CH_2$—O—$CF_2$—O—$CH_2$— and the like are included.

In formula (1), it is more preferable that A is an alkylene group or a fluoroalkylene group. Among them, a methylene group, an ethylene group, a fluoromethylene group or a fluoroethylene group, which may be blanched, is preferable, a methylene group (—$CH_2$—) or an ethylene group (—$CH_2CH_2$—) is more preferable, and a methylene group (—$CH_2$—) is particularly preferable.

In the formula (1), B represents substituted or unsubstituted methylene group, which may be branched, or substituted or unsubstituted fluoromethylene group, which may be branched. The number of carbon atoms of the methylene group represented by B is preferably 1 to 4. Examples of the methylene group include —$CH_2$—, —$CH(C_mH_{2m+1})$—, wherein m is an integer of 1-3, and —$C(C_nH_{2n+1})(C_mH_{2m+1})$—, wherein m and n are each independently 1 or 2, and a total of n and m is 2 or 3. Specifically, —$CH_2$—, —$CH(CH_3)$—, —$C(CH_3)_2$—, —$CH(C_2H_5)$—, —CH$(C_3H_7)$— and the like are included. In the formula (1), examples of the fluoromethylene group represented by B include a group obtained by replacing at least one of hydrogen atoms of above the methylene groups with fluorine atoms. Herein, the substitution number and the substitution position of fluorine are optional, and all the hydrogen atoms may be replaced with fluorine atoms.

In the formula (1), B is preferably —$CH_2$—, —CH$(CH_3)$—, —$C(CH_3)_2$—, —CHF—, or —$CH_2$—, more preferably —$CH_2$—, —$CH(CH_3)$—, or —$C(CH_3)_2$—, particularly preferably —$CH_2$—.

In the formula (1), the groups represented by A and B may have a substituent group, and examples of the substituent group include halogen (for example, chlorine, iodine, bromine) and the like.

The compound represented by the formula (1) is more preferably a 6 to 8-membered ring compound, still more preferably a 7-membered ring compound.

Examples of the preferable compound represented by the formula (1) include a compound of the formula (1), wherein Q is an oxygen atom (—O—), A is —$CH_2$—, —$(CH_2)_2$—, —$CH(CH_3)$—, —$C(CH_3)_2$— or —$CH_2CH(CH_3)$— and B is —$CH_2$—, —$CH(CH_3)$— or —$C(CH_3)_2$—.

The concrete examples of the compound represented by the formula (1) are illustrated in Table 1 but the present embodiment is not limited to them.

TABLE 1

| Compound No. | |
|---|---|
| 1 | (6-membered ring structure with two S(=O)$_2$ groups and O atoms) |
| 2 | (7-membered ring structure with two S(=O)$_2$ groups and O atoms) |
| 3 | (6-membered ring structure with two S(=O)$_2$ groups, O atoms, and two methyl groups) |
| 4 | (7-membered ring structure with two S(=O)$_2$ groups, O atoms, and one methyl group) |

In the present embodiment, the sulfur compounds may be used singly, and also used in combination of two or more.

The content of the sulfur compound in the electrolyte solution is, but not particularly limited, preferably 0.005% by mass or more and 5% by mass or less. When the content of the sulfur compound is set to within this range, the coating film can be more effectively formed onto the surface of the positive electrode. The content of the sulfur compound is more preferably 0.01% by mass or more, still more preferably 0.1% by mass or more. Further, it is more preferably 3% by mass or less.

The electrolyte solution used in the present embodiment comprises, but is not particularly limited to, for example, an electrolyte salt (supporting salt) and a non-aqueous electrolytic solvent (non-aqueous solvent) in addition to the sulfur compound.

Examples of the supporting salt include, but are not particularly limited to, lithium salts, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting salts may be used singly, and also used in combination of two or more.

It is preferable that the concentration of the supporting salt in the electrolyte solution is 0.5 to 1.5 mol/l. It becomes easy to adjust the density, the viscosity, the conductivity, and the like in an appropriate range by making the concentration of the supporting salt within the above-described range.

Examples of the non-aqueous solvent include, but are not particularly limited to, carbonates such as cyclic carbonates and chain carbonates, aliphatic carboxylic acid esters, γ-lactones, cyclic ethers, chain ethers, and fluorinated derivatives thereof. They may be used singly, and also used in combination of two or more.

Examples of the cyclic carbonates include propylene carbonate (PC), ethylene carbonate (EC), butylene carbonate (BC), vinylene carbonate (VC) and the like.

Examples of the chain carbonates include dimethyl carbonate (DMC), diethyl carbonate (DEC), ethyl methyl carbonate (EMC), dipropyl carbonate (DPC) and the like.

Examples of the aliphatic carboxylic acid esters include methyl formate, methyl acetate, ethyl propionate and the like.

Examples of the γ-lactones include γ-butyrolactone and the like.

Examples of the cyclic ethers include tetrahydrofuran, 2-methyltetrahydrofuran and the like.

Examples of the chain ethers include 1,2-diethoxyethane (DEE), Ethoxymethoxyethane (EME) and the like.

Examples of the non-aqueous solvent include dimethylsulfoxide, 1,3-dioxolane, formamide, acetamide, dimethylformamide, acetonitrile, propylnitrile, nitromethane, ethylmonoglyme, phosphoric acid triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ethers, N-methylpyrrolidone, fluorinated carboxylic acid esters, methyl-2,2,2-trifluoroethyl carbonate, methyl-2,2,3,3,3-pentafluoropropyl carbonate, trifluoromethyl ethylene carbonate, monofluoromethyl ethylene carbonate, difluoromethyl ethylene carbonate, 4,5-difluoro-1,3-dioxolane-2-one, monofluoro ethylene carbonate and the like. They may be used singly, and also used in combination of two or more.

[2] Negative Electrode

The secondary battery of the present embodiment has a negative electrode having a negative electrode active material. The negative electrode active material can be bound onto a negative electrode current collector with a negative electrode binder.

For example, the negative electrode of the present embodiment may have a negative electrode current collector formed from a metal foil and a negative electrode active material layer coated onto one side or both sides of the negative electrode current collector. The negative electrode active material layer is formed such that it covers the negative electrode current collector with the negative electrode binder. The negative electrode current collector is constructed such that it has an extended part, which connects to a negative electrode terminal, and the negative electrode active material layer is not formed on the extended part.

Examples of the negative electrode active material include lithium metal, a metal (a) capable of being alloyed with lithium, a metal oxide (b) capable of absorbing and desorbing lithium ions, a carbon material (c) capable of absorbing and desorbing lithium ions and the like, but the present invention is not limited to these. The negative electrode active materials may be used singly, and also used in combination of two or more.

Examples of the metal (a) include Al, Si, Pb, Sn, In, Bi, Ag, Ba, Ca, Hg, Pd, Pt, Te, Zn, La, alloys comprising two or more of these and the like. It may be used by mixing two or more of these metals and alloys. In addition, these metals and alloys may comprise one or more non-metal elements. Among these, as the negative electrode active material, it is preferable to use silicon, tin, or alloy thereof. By using silicon or tin as the negative electrode active material, a lithium secondary battery which is excellent in weight energy density and volume energy density can be provided.

Examples of the metal oxide (b) include silicon oxide, aluminum oxide, tin oxide, indium oxide, zinc oxide, lithium oxide, or a composite thereof. Among these, silicon oxide as the negative electrode active material is preferably used. Moreover, the metal oxide (b) may contain one or two or more elements selected from nitrogen, boron and sulfur in amounts of, for example, 0.1 to 5 mass %.

Examples of the carbon material (c) include graphite (such as artificial graphite and natural graphite), amorphous carbon, diamond-like carbon, a carbon nanotube, or a composite thereof.

Examples of the negative electrode binder include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, polyacrylic acid and the like, but the present invention is not limited to these. Among these, polyvinylidene fluoride or styrene-butadiene copolymer rubber is preferable from the view point of high binding force. The content of the negative electrode binder to 100 parts by mass of the negative electrode active material is preferably in the range of 0.5 to 25 parts by mass, more preferably 1 to 5 parts by mass.

As the negative electrode current collector, in view of electrochemical stability, aluminum, nickel, stainless-steel, chrome, copper, silver, and an alloy thereof are preferable. Examples of its shape include foil, plate-like, mesh-like and the like.

Conductive assisting agents may be added into the negative electrode active material layer comprising the negative electrode active material for the purpose of lowering the impedance. As the conductive assisting agents, carbonaceous fine particles, such as graphite, carbon black, acetylene black and the like, are exemplified.

The negative electrode can be produced by forming a negative electrode active material layer on a negative electrode current collector, wherein the negative electrode active material layer contains a negative electrode active material and a negative electrode binder. Examples of the forming method of the negative active electrode material layer include a doctor blade method, a die coater method, a CVD method, a sputtering method and the like. After forming the negative electrode active material layer in advance, a thin film of aluminum, nickel or an alloy thereof is formed on the negative electrode active material layer by a method such as vapor deposition and sputtering, and thereby a negative electrode may also be manufactured.

[3] Positive Electrode

The positive electrode can be manufactured by forming a positive electrode active material layer comprising a positive electrode active material and a binder for a positive electrode on a positive electrode current collector.

For example, the positive electrode of the present embodiment may have a positive electrode current collector formed from a metal foil and a positive electrode active material layer coated onto one side or both sides of the positive electrode current collector. The positive electrode active material layer is formed such that it covers the positive electrode collector with the positive electrode binder. The positive electrode current collector is constructed such that it has an extended part which connects to a positive electrode terminal, and the positive electrode active material layer is not formed on the extended part.

The positive electrode active material is not particularly limited as long as it is a material capable of absorbing and desorbing lithium, but for example, a lithium-containing composite oxide may be used. LiM1O$_2$, wherein M1 is at least one element selected from Mn, Fe, Co and Ni, and a part of M1 may be replaced with Mg, Al or Ti; LiMn$_{2-x}$M2$_x$O$_4$, wherein M2 is at least one element selected from the group consisting of Mg, Al, Co, Ni, Fe and B, and 0≤x<0.4, may be used as the lithium-containing composite oxide. In addition, an olivine-type material represented by LiFePO$_4$ may be also used. They may have non-stoichiometric composition, such as Li-excess composition. Materials obtained by substituting a part of these metal oxides with Al, Fe, P, Ti, Si, P, Sn, In, Bi, Ag, Ba, Ca, Hg, Pd, Pt, Te, Zn, La, or the like may also be used.

The positive electrode active material of the present embodiment is not limited as long as it is a material capable of absorbing and desorbing lithium but from the viewpoint of achieving higher energy density, it preferably contains a high capacity compound. Examples of the high capacity compound include lithium acid nickel (LiNiO$_2$), or lithium nickel composite oxides in which a part of the Ni of lithium acid nickel is replaced by another metal element, and layered lithium nickel composite oxides represented by the following formula (A) are preferred.

$$Li_yNi_{(1-x)}M_xO_2 \quad (A)$$

wherein 0≤x<1, 0<y≤1.2, and M is at least one element selected from the group consisting of Co, Al, Mn, Fe, Ti, and B.

From the viewpoint of high capacity, it is preferred that the content of Ni is high, that is, x is preferably 0.5 or less, more preferably less than 0.5, still more preferably 0.4 or less in the formula (A). Examples of such compounds include Li$_\alpha$Ni$_\beta$Co$_\gamma$Mn$_\delta$O$_2$ (0<α≤1.2, preferably 1≤α=1.2, β+γ+δ=1, β≥0.7, and γ≤0.2) and Li$_\alpha$Ni$_\beta$Co$_\gamma$Al$_\delta$O$_2$ (0<α≤1.2, preferably 1≤α≤1.2, β+γ+δ=1, β≥0.7, and γ≤0.2) and particularly include LiNi$_\beta$Co$_\gamma$Mn$_\delta$O$_2$ (0.75≤β≤0.85, 0.05≤γ≤0.15, and 0.10≤δ≤0.20). More specifically, for example, LiNi$_{0.8}$Co$_{0.05}$Mn$_{0.15}$O$_2$, LiNi$_{0.8}$Co$_{0.1}$Mn$_{0.1}$O$_2$, LiNi$_{0.8}$Co$_{0.15}$Al$_{0.05}$O$_2$, and LiNi$_{0.8}$Co$_{0.1}$Al$_{0.1}$O$_2$ may be preferably used.

In addition, from the viewpoint of thermal stability, it is also preferred that the content of Ni does not exceed 0.5, that is, x is 0.5 or more in the formula (A). In addition, it is also preferred that particular transition metals do not exceed half. Examples of such compounds include Li$_\alpha$Ni$_\beta$Co$_\gamma$Mn$_\delta$O$_2$ ($0<\alpha\leq 1.2$, preferably $1\leq\alpha\leq 1.2$, $\beta+\gamma+\delta=1$, $0.2\leq\beta\leq 0.5$, $0.1\leq\gamma\leq 0.4$, and $0.1\leq\delta\leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including these compounds in which the content of each transition metal fluctuates by about 10%).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

In addition, positive electrode active materials that have a charge/discharge area at 4.5 V or more versus lithium metal may be used. As the positive electrode active materials that operate at a potential of 4.5 V or more versus lithium metal, lithium-containing composite oxides are preferred. A layered-type lithium nickel composite oxide represented by $Li_a(M_xMn_{2-x-y}A_y)(O_{4-w}Z_w)$ ($0.4\leq x\leq 1.2$, $0\leq y$, $x+y<2$, $0\leq a<2$, preferably $a\leq 1.2$, $0\leq w\leq 1$, M is at least one selected from the group consisting of Co, Ni, Fe, Cr, and Cu, A is at least one selected from the group consisting of Li, B, Na, Mg, Al, Ti, Si, K, and Ca, and Z is at least one of F and CO, such as $Li_xMn_{1.5}Ni_{0.5}O_4$ ($0<x<2$); an olivine-type composite oxide represented by $Li_xMPO_4F_y$ ($0\leq x\leq 2$, $0\leq y\leq 1$, and M is at least one of Co and Ni); a Si-containing composite oxide represented by $Li_xMSiO_4$ ($0\leq x\leq 2$, and M is at least one of Mn, Fe and Co); a layered-type composite oxide represented by $Li_x[Li_aM_bMn_{1-a-b}]O_2$ ($0\leq x\leq 1$, $0.02\leq a\leq 0.3$, $0.1<b<0.7$, and M is at least one of Ni, Co, Fe and Cr), and the like may be used as the lithium-containing composite oxides.

Among them, as the positive electrode active material, a lithium nickel composite oxide having layered structure is preferably used, and $Li_yNi_{(1-x)}M_xO_2$ ($0\leq x\leq 0.7$, $0<y\leq 1.20$, and M consists of at least one element selected from the group consisting of Co, Al, Mn, Fe, Ti, and B) is more preferably used. Since a more stable coating film can be formed on a surface of the positive electrode by using these materials, change of the crystalline structure can be prevented effectively. As a result, by the film-forming effect, it is possible to effectively prevent the conventional deterioration of the cycle characteristics, associated with increase in the number of charge and discharge.

In cases where a layered-type lithium nickel composite oxide is comprised, the content of the layered-type lithium nickel composite oxide is not particularly limited but it is preferably 10% by mass or more, more preferably 30% by mass or more, more preferably 50% by mass or more, and still more preferably 70% by mass or more, of the positive electrode active materials.

In addition, the lithium nickel composite oxide may be used in combination with a lithium manganese composite oxide having spinel structure as the positive electrode material. By using these materials, it is possible to obtain a secondary battery at a low cost, wherein the secondary battery is excellent in safety and has a high discharge capacity.

As the positive electrode binder, the same materials as mentioned for the negative electrode binder may be used. Polyvinylidene fluoride is preferred from the viewpoint of versatility and low cost among them. The amount of the positive electrode binder is preferably 2 to 10 parts by mass based on 100 parts by mass of the positive electrode active material.

As the positive electrode current collector, the same materials as mentioned for the negative electrode current collector may be used.

Conductive assisting agents may be added into the positive electrode active material layer comprising the positive electrode active material for the purpose of lowering the impedance. As the conductive assisting agents, carbonaceous fine particles, such as graphite, carbon black, acetylene black and the like, are exemplified.

[4] Separator

As a separator, porous films or non-woven fabrics, which are formed of polypropylene, polyethylene, or the like, may be used, but the present invention is not particularly limited to these. In addition, these may be stacked and used as a separator.

[5] Package

The package is not particularly limited but, for example, a laminate film may be used. For example, in the case of a stacked laminate type secondary battery, a laminate film made of polypropylene, polyethylene, or the like, coated with aluminum or silica, may be used.

[6] Secondary Battery

For example, the secondary battery of the present embodiment, using non-aqueous electrolyte solution, has structure as shown in FIG. 1. In the positive electrode, a layer 1 comprising a positive electrode active material is formed on a positive electrode current collector 3. In the negative electrode, a layer 2 comprising a negative electrode active material is formed on a negative electrode current collector 4. These positive electrode and negative electrode are disposed so as to face each other with a porous separator 5 between them. The porous separator 5 is disposed generally parallel to the layer 2 comprising a negative electrode active material. An electrode element where these positive electrode and negative electrode are disposed so as to face each other (also referred to as "electrode stack" or "battery element") and the electrolyte solution are enclosed in packages 6 and 7 in the secondary battery. A positive electrode tab 9 is connected to the positive electrode current collector 3, a negative electrode tab 8 is connected to the negative electrode current collector 4, and these tabs are drawn out on the package. Shape of the non-aqueous electrolyte secondary battery, such as lithium secondary battery, according to the present embodiment is not particularly limited, but examples of the shape include a laminate packaging type, a cylindrical type, a prismatic type, a coin type and the like.

Figure 2:
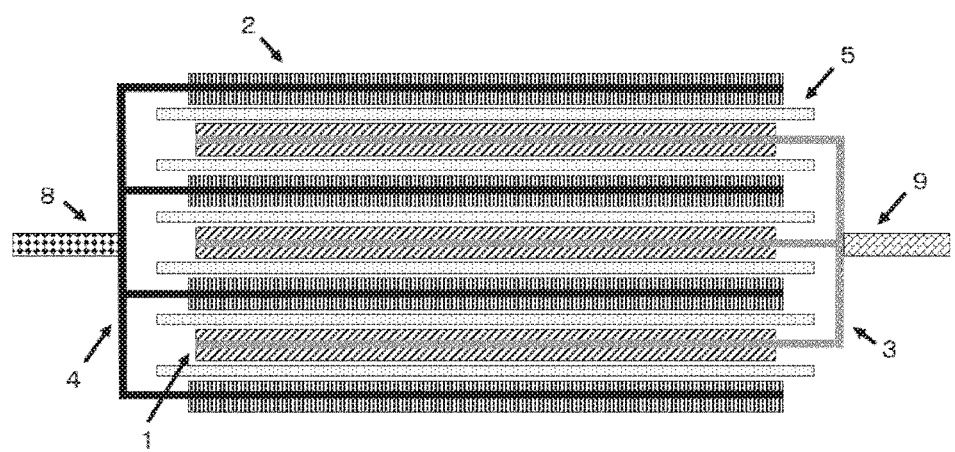
FIG. 2 is a schematic cross-sectional view showing the structure of the electrode stack of a stacking laminate type secondary battery.

As shown in FIG. 2, the electrode element may have an arrangement in which a plurality of positive electrodes and a plurality of negative electrodes are stacked via separators. In addition, the positive electrode active material layer 1 and the negative electrode active material layer 2 may be provided on both surfaces of the current collectors respectively.

Figure 3:
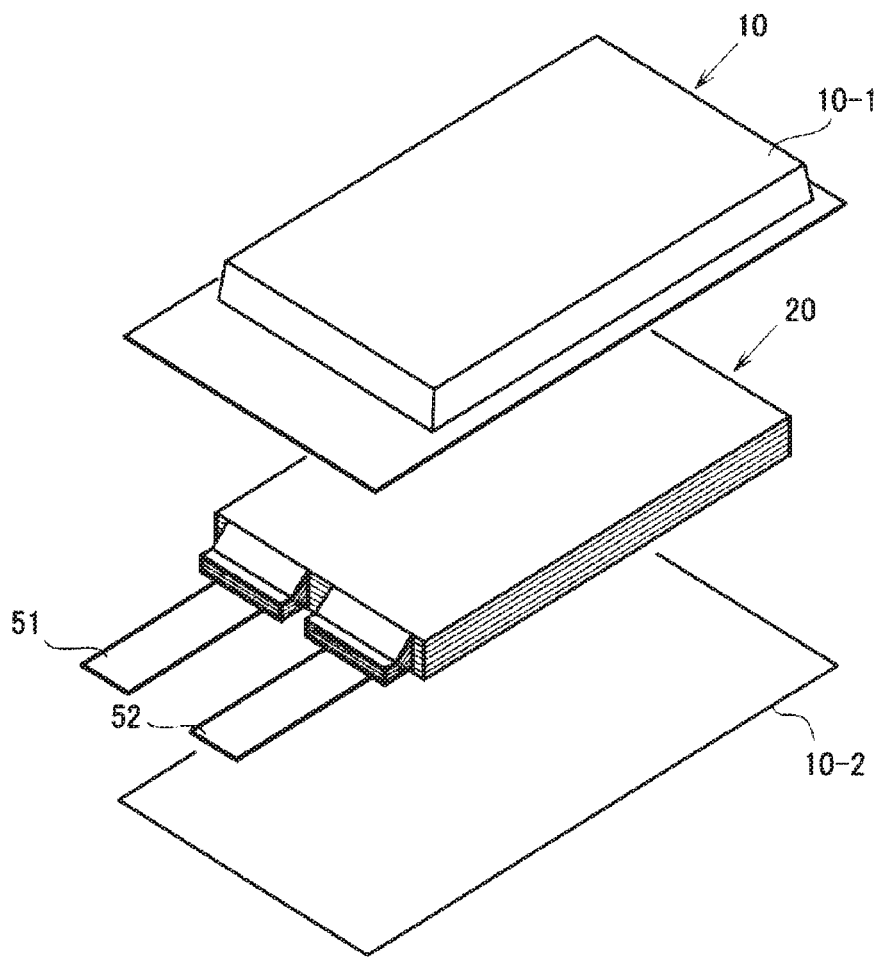
FIG. 3 is an exploded perspective view showing the basic structure of a film-packaged battery.
Figure 4:
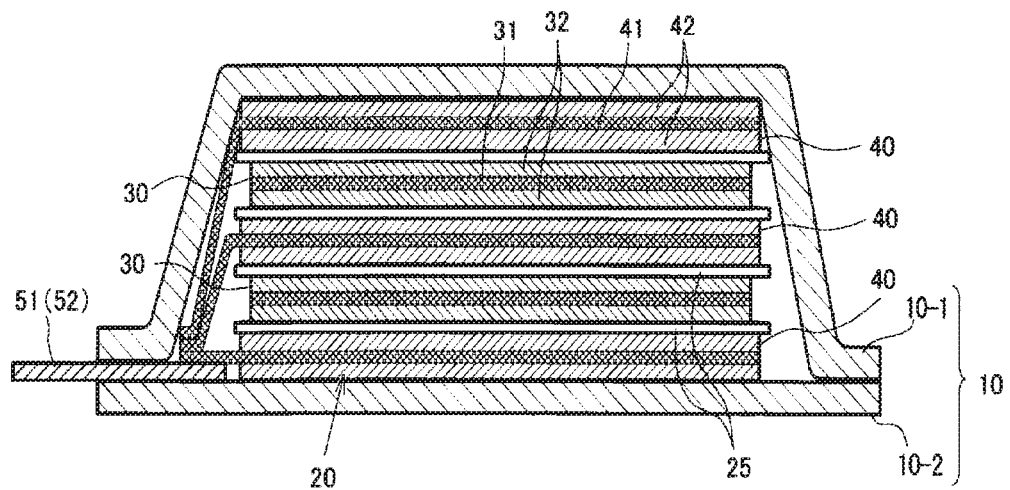
FIG. 4 is a cross-sectional view schematically showing a cross section of the battery in FIG. 3.

As another embodiment, a secondary battery having structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

Further, the secondary battery according to the present embodiment may be formed into an assembled battery by combining plurality batteries.

The lithium secondary battery according to the present embodiment is characterized in that at least one negative secondary ion peak selected from $CH_3S_2O_6^-$ and $CHS_2O_4^-$ and a negative secondary ion peak of $SO_3^-$ are detected from a surface of the positive electrode after charge/discharge by a Time-of-Flight Secondary Ion Mass Spectrometry (TOF-SIMS) method. Such secondary battery is obtained by making sulfur exist on a surface of the positive electrode (or forming a coating film comprising sulfur on the surface of the positive electrode active material) by charging a lithium secondary battery manufactured by using, for example, an electrolyte solution comprising the sulfur compound as an additive, a positive electrode and a negative electrode.

The charging condition is not especially limited and it may be accordingly determined depending on constitution of the secondary battery. For example, in the case of using a 4 V class active material, the upper limit voltage is preferably from 4.1 V to 4.3 V. In addition, the charging mode is desirably CCCV mode, namely, a mode in which charging is performed at a constant current until the upper limit voltage is reached, and after the upper limit voltage being reached, the upper limit voltage is maintained while the current is reduced. The constant charging current until the upper limit voltage is reached is preferably in the range of 0.1 C to 0.5 C. The 0.1 C current herein refers to a current that, in the case where any of a fully charged battery is discharged at a constant current, requires 10 hours to allow the battery to be completely discharged, and 0.5 C refers to a current that requires 2 hours to allow the battery to be completely discharged. The charging period is preferably from 6 to 24 hours. At least one charge cycle, normally 1 to 3 charge cycles just have to be performed on said condition but the number of the cycle may be increased as necessary.

Furthermore, in one embodiment, it is found that aging after charging can improve a capacity maintenance rate of the secondary battery. The aging is preferably carried out in a state of charge, and, for example, the aging may be carried out after charging in said charge condition, or after performing a discharge/charge cycle in another charge condition after charging in said charge condition. The aging temperature is preferably 35° C. or more and 80° C. or less, more preferably 40° C. or more and 60° C. or less. The aging period is preferably 24 hours or more, more preferably three days or more. In addition, when the production efficiency and the like are taken into consideration, it is preferably 25 days or less. It is possible that the aging processing improves stability of the coating film formed on the surface of the positive electrode and reduces internal resistance.

The secondary battery and the assembled battery as described herein can be suitably used as a motor driving power source used for vehicle applications such as an automobile, and also a storage battery for use in household energy storage system or a solar power system.

EXAMPLES

Hereafter, an embodiment of the present invention will be explained in details by using examples, but the present invention is not limited to these examples.

Example 1

(Manufacturing of Electrodes)
<Negative Electrode>

As a negative electrode active material, graphite was used. This negative electrode active material, polyvinylidene fluoride as a negative electrode binder, and acetylene black as a conductive assisting agent were weighed at a mass ratio of 85:10:5. Then, these were mixed with N-methylpyrrolidone to prepare negative electrode slurry. After the negative electrode slurry was applied on a copper foil having a thickness of 10 μm, it was dried and further heat-treated at 120° C. under a nitrogen atmosphere to prepare a negative electrode.
<Positive Electrode>

As a positive electrode active material, $Li(Ni_{0.5}Co_{0.2}Mn_{0.3})O_2$ (hereafter, it is abbreviated as NCM in some cases) was used. This positive electrode active material, carbon black as a conductive assisting agent, and polyvinylidene fluoride as a positive electrode binder were weighed at a mass ratio of 90:5:5. Then, these were mixed with N-methylpyrrolidone to prepare positive electrode slurry. The positive electrode slurry was applied on an aluminum foil having a thickness of 20 μm, then it was dried and further pressed to prepare a positive electrode.
<Electrode Stack>

The obtained three layers of the positive electrodes and four layers of the negative electrodes were stacked alternately via a polypropylene porous film as a separator. The end portions of the positive electrode current collectors that were not covered with the positive electrode active material and the end portions of the negative electrode current collectors that were not covered with the negative electrode active material were welded individually. Further, to the welding positions, an aluminum positive electrode terminal and a nickel negative electrode terminal were welded respectively, to obtain an electrode stack having a planar stacked structure.

<Electrolyte Solution>

A mixed solvent of the EC and DEC (volume ratio: EC/DEC=30/70) was used as a solvent for non-aqueous electrolyte solution, and $LiPF_6$ was dissolved as a supporting salt so that the concentration in the electrolyte solution becomes 1M.

The compound No. 1 shown in Table 1 was added in the amount of 1.6% by weight in a non-aqueous electrolyte solution as an additive to prepare a non-aqueous electrolyte solution.

<Secondary Battery>

The electrode stack was accommodated in an aluminum laminate film as a package, and then the electrolyte solution was injected inside the package. Thereafter, the package was sealed while the pressure was reduced to 0.1 atm, to prepare a secondary battery.

<Formation of a Coating Film on a Surface of the Negative Electrode>

The produced secondary batteries was charged to 4.2 V in CCCV mode (charge condition: CC current 0.15C, CV 3 hours) in a thermostatic chamber maintained at 25° C. Then, after it was discharged to 3 V in CC mode (CC current: 1C), it was charged to 4.2 V in CCCV mode (CC current: 1C, CV time: 1.5 hours) again, and then stored for one week in a thermostatic chamber maintained at 45° C. to perform aging.

<Evaluation>

(Mass Analysis of the Surface of the Positive Electrode Active Material by TOF-SIMS Method)

After the produced secondary battery was discharged to 3.0 V, it was disassembled under an argon atmosphere to cut out a positive electrode. The positive electrode was that obtained by forming a positive electrode active material layer on a surface of a current collector. Mass analysis of the surface components of the positive electrode active material layer was performed by TOF-SIMS method.

TOF. SIMS (trade name) from ION-TOF was used in the mass analysis by TOF-SIMS method. The analysis conditions were as follows: primary ion species: $Bi^{3++}$, primary ion energy: 30 eV, pulse width: 3.1 ns, mass range (m/z): 1-1500, measurement area: 200 μm×200 μm. An ion component having a molecular weight corresponds to the detected mass was estimated from the components of the electrolyte solution, based on the mass analysis result.

(Capacity Maintenance Rate at 45° C.)

In a thermostatic chamber maintained at 45° C., the produced secondary battery after the coating film formation on the positive electrode was subjected to charge and discharge cycle test, where charge/discharge was repeated in the voltage range of 2.5 V to 4.2 V, to evaluate the cycle maintenance rate (capacity maintenance rate) (%). Charging was performed for 2.5 hours in total at a constant voltage after charging to 4.2 V at 1C. Discharging was performed to 2.5 V at a constant current of 1C.

"Capacity maintenance rate (%)" was calculated by the formula, (the discharge capacity after 200 cycles)/(the discharge capacity after one cycle)×100 (unit: %).

The results are shown in table 2.

Example 2

Secondary batteries were produced and evaluated as in the same manner as Example 1 except that the compound No. 2 shown in Table 1 was used as an additive for the electrolyte solution instead of the compound No. 1. The results are shown in table 2.

Comparative Example 1

Secondary batteries were produced and evaluated as in the same manner as Example 1 except that the compound No. 1 shown in table 1 was not added. The results are shown in table 2.

Comparative Example 2

Secondary batteries were produced and evaluated as in the same manner as Example 1 except that 1,3-propanesultone (hereafter, it is abbreviated as PS in some cases) was used instead of the compound No. 1 shown in table 1. The results are shown in table 2.

Example 3

Secondary batteries were produced and evaluated as in the same manner as Example 1 except that the aging temperature during the coating film formation was set to 25° C. instead of 45° C. The results are shown in table 2.

Example 4

Secondary batteries were produced and evaluated as in the same manner as Example 1 except that the aging period during the coating film formation was set to 25 days instead of 1 week. The results are shown in table 2.

TABLE 2

| | electrolyte solution additive | Positive electrode active material | Aging temperature during the coating film formation | Peak Intensity of $CH_3S_2O_6^-$ (I2*) | Peak intensity of $SO_3^-$ (I1*) | I1/I2 | Capacity maintenance rate after 200 cycles (%) |
|---|---|---|---|---|---|---|---|
| Example 1 | Compound No. 1 | NCM | 45° C. | 1.22E−04 | 2.94E−02 | 240.98 | 86.0 |
| Example 2 | Compound No. 2 | NCM | 45° C. | 1.35E−04 | 3.20E−02 | 237.04 | 84.3 |
| Comparative example 1 | none | NCM | 45° C. | Less than 1.00E−05 | Less than 1.00E−05 | — | 75.0 |
| Comparative example 2 | 1,3-PS | NCM | 45° C. | Less than 1.00E−05 | 6.89E−02 | — | 77.8 |
| Example 3 | Compound No. 1 | NCM | 25° C. | 2.14E−04 | 3.77E−02 | 176.17 | 79.4 |

TABLE 2-continued

| | electrolyte solution additive | Positive electrode active material | Aging temperature during the coating film formation | Peak Intensity of CH₃S₂O₆⁻ (I2*) | Peak intensity of SO₃⁻ (I1*) | I1/I2 | Capacity maintenance rate after 200 cycles (%) |
|---|---|---|---|---|---|---|---|
| Example 4 | Compound No. 1 | NCM | 45° C. | 1.21E−04 | 6.21E−02 | 513.50 | 82.8 |

(*Arbitrary unit, detection limit 1.00E−05)

It was found from the results of the cycle evaluation in Examples 1-4, that an excellent capacity maintenance rate is shown in the case of the lithium secondary battery, wherein a positive electrode surface detection component comprises the negative secondary ion peak of $CH_3S_2O_6^-$ and further comprises the negative secondary ion peak of $SO_3^-$ when a primary ion is irradiated on the surface of the positive electrode active material after initial charge/discharge by a Time-of-Flight Secondary Ion Mass Spectrometry (TOF-SIMS) method. In particularly, both a capacity maintenance rate and a discharge capacity are remarkably improved in Examples 1 and 2.

This application is based upon and claims the benefit of priority from Japanese patent application No. 2014-161081, filed on Aug. 7, 2014, the disclosure of which is incorporated herein in its entirety by reference.

INDUSTRIAL APPLICABILITY

The secondary battery of the present invention may be used in any industrial field where power supply is needed, and in industrial fields related to transport, storage, and supply of electric energy. More specifically, the secondary battery may be used for power sources for mobile devices such as cellular phone and notebook computer; power sources for transfer/transport vehicles including electrically-powered vehicles such as electric vehicle, hybrid vehicle, electric motorcycle and power-assisted bicycle, electric train, satellite, and submarine; backup power sources such as UPS; power storage system to store electric power generated by solar power generation, wind power generation, or the like; and the like.

EXPLANATION OF SYMBOLS

1 Positive electrode active material layer
2 Negative electrode active material layer
3 Positive electrode current collector
4 Negative electrode current collector
5 Porous separator
6 Laminated exterior body
7 Laminated exterior body
8 Negative electrode tab
9 Positive electrode tab
10 Film outer package
20 Battery element
25 Separator
30 Positive electrode
40 Negative electrode

The invention claimed is:

1. A lithium secondary battery having a positive electrode comprising a positive electrode active material capable of absorbing and releasing lithium ions, a negative electrode comprising a negative electrode active material capable of absorbing and releasing lithium ions, and an electrolyte solution, wherein a positive electrode surface detection component comprises a negative secondary ion peak of $CH_3S_2O_6^-$, and further comprises a negative secondary ion peak of $SO_3^-$,
    wherein the positive electrode surface detection component is detected when a primary ion is irradiated on a surface of the positive electrode active material by a Time-of-Flight Secondary Ion Mass Spectrometry (TOF-SIMS) method,
    wherein a peak intensity ratio of the negative secondary ions (I1/I2), measured by the Time-of-Flight Secondary Ion Mass Spectrometry (TOF-SIMS) method, satisfies an equation, 200≤I1/I2≤500, wherein I1 is a peak intensity of $SO_3^-$, and I2 is a peak intensity of $CH_3S_2O_6^-$,
    wherein the positive electrode active material comprises a lithium nickel composite oxide having layered structure in an amount of 30 mass % or more, and
    wherein the lithium nickel composite oxide having layered structure is

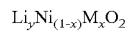
    $Li_yNi_{(1-x)}M_xO_2$ wherein 0<x≤0.5, 0<y≤1.20, and M comprises Co and Mn.

2. The lithium secondary battery according to claim 1, wherein it has the electrolyte solution comprising a sulfur compound.

3. The lithium secondary battery according to claim 2, wherein the sulfur compound is at least one selected from compounds represented by a formula (1)

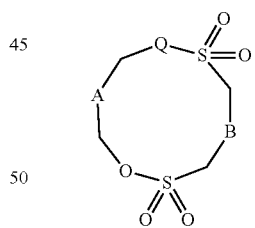

(1)

wherein Q represents an oxygen atom, a methylene group, or a C—S single bond; A represents a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which a plurality of alkylene units, a plurality of fluoroalkylene units, or an alkylene unit and a fluoroalkylene unit are bonded through an ether bond; and B represents substituted or unsubstituted methylene group, which may be branched; or substituted or unsubstituted fluoromethylene group, which may be branched.

4. A vehicle equipped with the lithium secondary battery according to claim 1.

5. A lithium secondary battery having a positive electrode comprising a positive electrode active material capable of absorbing and releasing lithium ions, a negative electrode comprising a negative electrode active material capable of absorbing and releasing lithium ions, and an electrolyte solution, wherein a positive electrode surface detection component comprises a negative secondary ion peak of $CH_3S_2O_6^-$, and further comprises a negative secondary ion peak of $SO_3^-$,
- wherein the positive electrode surface detection component is detected when a primary ion is irradiated on a surface of the positive electrode active material by a Time-of-Flight Secondary Ion Mass Spectrometry (TOF-SIMS) method,
- wherein a peak intensity ratio of the negative secondary ions (I1/I2), measured by the Time-of-Flight Secondary Ion Mass Spectrometry (TOF-SIMS) method, satisfies an equation, $200 \leq I1/I2 \leq 500$, wherein I1 is a peak intensity of $SO_3^-$, and I2 is a peak intensity of $CH_3S_2O_6^-$,
- wherein the positive electrode active material comprises a lithium nickel composite oxide having layered structure in an amount of 30 mass % or more, and
- wherein the battery has been charged to a voltage of 4.1 V to 4.3 V at a rate of 0.1 C to 0.5C during an initial charge.

6. The lithium secondary battery according to claim 5, wherein the battery has been aged at a voltage of 4.1 V to 4.3 V at a temperature of 40° C. to 60° C. for 24 hours to 25 days after the initial charge.

\* \* \* \* \*

UNITED STATES PATENT AND TRADEMARK OFFICE
CERTIFICATE OF CORRECTION

PATENT NO. : 10,840,551 B2
APPLICATION NO. : 15/502027
DATED : November 17, 2020
INVENTOR(S) : Shimanuki et al.

It is certified that error appears in the above-identified patent and that said Letters Patent is hereby corrected as shown below:

On the Title Page

Item (57), Line 8 of ABSTRACT, "$CH_3S_2O_{6\text{-}}$" should read -- $CH_3S_2O_6^-$ --.

Item (57), Line 9 of ABSTRACT, "$CHS_2O_{4\text{-}}$" should read -- $CHS_2O_4^-$ --.

Item (57), Line 10 of ABSTRACT, "$SO_3$—" should read -- $SO_3^-$ --.

In the Claims

Claim 1, Column 16, Line 14, "$CH_3S_2O_{6\text{-}}$" should read -- $CH_3S_2O_6^-$ --.

Claim 1, Column 16, Line 15, "$SO_{3\text{-}}$" should read -- $SO_3^-$ --.

Claim 1, Column 16, Line 25, "$SO_{3\text{-}}$" should read -- $SO_3^-$ --.

Claim 1, Column 16, Line 26, "$CH_3S_2O_{6\text{-}}$" should read -- $CH_3S_2O_6^-$ --.

Claim 5, Column 17, Line 8, "$CH_3S_2O_{6\text{-}}$" should read -- $CH_3S_2O_6^-$ --.

Claim 5, Column 17, Line 9, "$SO_{3\text{-}}$" should read -- $SO_3^-$ --.

Claim 5, Column 17, Line 19, "$SO_{3\text{-}}$" should read -- $SO_3^-$ --.

Claim 5, Column 17, Line 20, "$CH_3S_2O_{6\text{-}}$" should read -- $CH_3S_2O_6^-$ --.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*